United States Patent
Kouscheschi et al.

(10) Patent No.: US 8,500,336 B2
(45) Date of Patent: Aug. 6, 2013

(54) GUIDE ROLLER ROTATING BEARING FOR A METAL MELT BATH

(75) Inventors: Alireza Kouscheschi, Cologne (DE); Roman Lieutenant, Willich (DE); Wilfried Plaetzer, Krefeld (DE); Daniel Plaetzer, Duisburg (DE)

(73) Assignee: Band Zink GmbH, Langenfeld (DE)

( * ) Notice: Subject to any disclaimer, the term of this patent is extended or adjusted under 35 U.S.C. 154(b) by 266 days.

(21) Appl. No.: 13/060,691

(22) PCT Filed: Aug. 27, 2009

(86) PCT No.: PCT/EP2009/061044
§ 371 (c)(1),
(2), (4) Date: Feb. 25, 2011

(87) PCT Pub. No.: WO2010/023239
PCT Pub. Date: Mar. 4, 2010

(65) Prior Publication Data
US 2011/0150382 A1    Jun. 23, 2011

(30) Foreign Application Priority Data
Sep. 1, 2008    (EP) ..................................... 08015384

(51) Int. Cl.
*F16C 13/00* (2006.01)
(52) U.S. Cl.
USPC ....................................................... 384/418
(58) Field of Classification Search
USPC ...... 384/416–419, 425, 569, 907.1; 118/419, 118/423
See application file for complete search history.

(56) References Cited

U.S. PATENT DOCUMENTS

| | | | | |
|---|---|---|---|---|
| 5,538,558 | A | * | 7/1996 | Ookouchi et al. ............. 118/423 |
| 5,549,393 | A | * | 8/1996 | Morando ....................... 384/203 |
| 5,718,519 | A | | 2/1998 | Ookouchi et al. |
| 5,954,880 | A | * | 9/1999 | Aoki et al. ..................... 118/423 |
| 6,554,904 | B1 | * | 4/2003 | Gimpel et al. ................. 118/423 |
| 7,156,920 | B2 | * | 1/2007 | Plaetzer et al. ............... 118/423 |
| 7,175,711 | B2 | * | 2/2007 | Platzer ........................... 118/423 |
| 2003/0111777 | A1 | | 6/2003 | Morando |
| 2010/0192849 | A1 | * | 8/2010 | de Kock et al. ............... 118/423 |

FOREIGN PATENT DOCUMENTS

| | | |
|---|---|---|
| DE | 10236113 B3 | 4/2004 |
| EP | 0 610 167 A1 | 8/1994 |
| JP | 1159359 A | 6/1989 |
| JP | 2153055 A | 6/1990 |
| JP | 10159844 A | 6/1998 |
| WO | WO 2008/099819 A1 | 8/2008 |

* cited by examiner

*Primary Examiner* — Phillip A Johnson
(74) *Attorney, Agent, or Firm* — Norman B. Thot

(57) ABSTRACT

Guide roller rotating bearing for a metal melt bath includes pivot arms and a roller bearing device arranged on each of the pivot arms. The roller bearing device includes an outer ring, cylindrical rollers and an inner ring. The outer ring includes first and second outer ring flange members. The outer ring is fixed to a pivot arm. The cylindrical rollers are configured as rolling elements. The inner ring has first and second inner ring flange members. The first and second outer ring flange members and the first and second inner ring flange members are configured to fix the cylindrical rollers in an axial direction. A shaft end includes a protective covering disposed in the roller bearing device. The protective covering includes a protective covering material that exhibits a wear-resistance which is higher than a wear resistance of the shaft end.

10 Claims, 3 Drawing Sheets

GUIDE ROLLER ROTATING BEARING FOR A METAL MELT BATH

CROSS REFERENCE TO PRIOR APPLICATIONS

This application is a U.S. National Phase application under 35 U.S.C. §371 of International Application No. PCT/EP2009/061044, filed on Aug. 27, 2009 and which claims benefit to European Patent Application No. 08015384.4, filed on Sep. 1, 2008. The International Application was published in German on Mar. 4, 2010 as WO 2010/023239 A1 under PCT Article 21(2).

FIELD

The invention provides a guide roller rotating bearing for a metal melt bath which includes a shaft that is rotatably supported in the molten metal by shaft ends in roller bearing devices. The shaft ends are supported in the roller bearing devices for displacement in both axial directions. The roller bearing devices are arranged on pivot arms and comprise an outer ring fixed to the pivot arm, cylindrical rollers as rolling elements, and an inner ring. The cylindrical rollers are fixed in both axial directions by means of flange members of the inner ring.

BACKGROUND

Guide roller rotating bearings are used in coating plants for coating a metal band in a melt of coating metal. The coating devices are used to coat metal bands with a corrosion-resistant layer of zinc, tin, lead, aluminum, Galvalume® or Galfan®. To achieve this, the metal band is drawn through a metal melt of the respective coating metal which is several 100° C. hot. For stabilizing and guiding purposes, rotating shafts are arranged as guide rollers in the metal melt. The rotating guide roller is supported in the metal melt in bearing devices that are configured as wearing bearings. In this context, DE 102 36 116 B3 describes the configuration of such a bearing device as a sliding bearing device. Such a sliding bearing device has a high degree of wear and material removal, which in turn requires the frequent replacement of bearing parts which entails substantial costs.

JP 01 159359 A describes a guide roller rotating bearing with a roller bearing of the above-mentioned type which, however, is characterized by a pronounced wear of the shafts and whose roller bearings are difficult to replace.

SUMMARY

An aspect of the present invention is to provide a guide roller rotating bearing that avoids the above-mentioned disadvantages.

In an embodiment, the present invention provides a guide roller rotating bearing for a metal melt bath which includes pivot arms and a roller bearing device arranged on each of the pivot arms. The roller bearing device includes an outer ring, cylindrical rollers and an inner ring. The outer ring includes first and second outer ring flange members. The outer ring is fixed to a pivot arm. The cylindrical rollers are configured as rolling elements. The inner ring has first and second inner ring flange members. The first and second outer ring flange members and the first and second inner ring flange members are configured to fix the cylindrical rollers in an axial direction. A shaft end includes a protective covering disposed in the roller bearing device. The protective covering includes a protective covering material that exhibits a wear-resistance which is higher than a wear resistance of the shaft end.

BRIEF DESCRIPTION OF THE DRAWINGS

The present invention is described in greater detail below on the basis of embodiments and of the drawings in which.

DETAILED DESCRIPTION

In an embodiment of the guide roller rotating bearing of the present invention, the shaft ends have a protective coating of a material that is more wear-resistant than the material of the shaft end which is supported in a roller bearing device such that it is displaceable in both axial directions. The roller bearing device comprises an outer ring fixed to the pivot arm, cylindrical rollers as rolling elements and an inner ring. The cylindrical rollers are fixed in both axial directions by flange members on the inner and the outer ring.

A bearing device of such design provides a running smoothness with low wear. Wear parts can be removed in a simple and economic manner.

To compensate for an axial movement and a simultaneous angular offset of the shaft ends of the guide roller, the surface of the inner ring facing the protective covering can be convex in the longitudinal section. A substantially punctual contact and the rotatability of the inner ring allow achieving an effect similar to the sliding effect of a sliding bearing, while retaining the advantages of a roller bearing.

In an embodiment of the present invention, a high degree of wear resistance of the guide roller rotating bearing can be achieved by making the inner ring, the cylindrical rollers and/or the outer ring from a ceramic material.

In an embodiment of the present invention, the protective covering can be a hard alloy on a cobalt-chromium basis. In this case, the protective covering can be a coating, but it may also be realized in the form of a rotationally fixed bushing. This bushing may be held on the shaft end by means of a clamping member.

In an embodiment of the present invention, a thrust washer of ceramic material may be provided as an axial bearing arranged in the axial direction opposite the shaft end.

In an embodiment of the present invention, a flange member can be designed as a loose flange element which is provided as a safety ring on the outer ring. In this manner, a replacement of wear parts is substantially facilitated.

Figure 1:
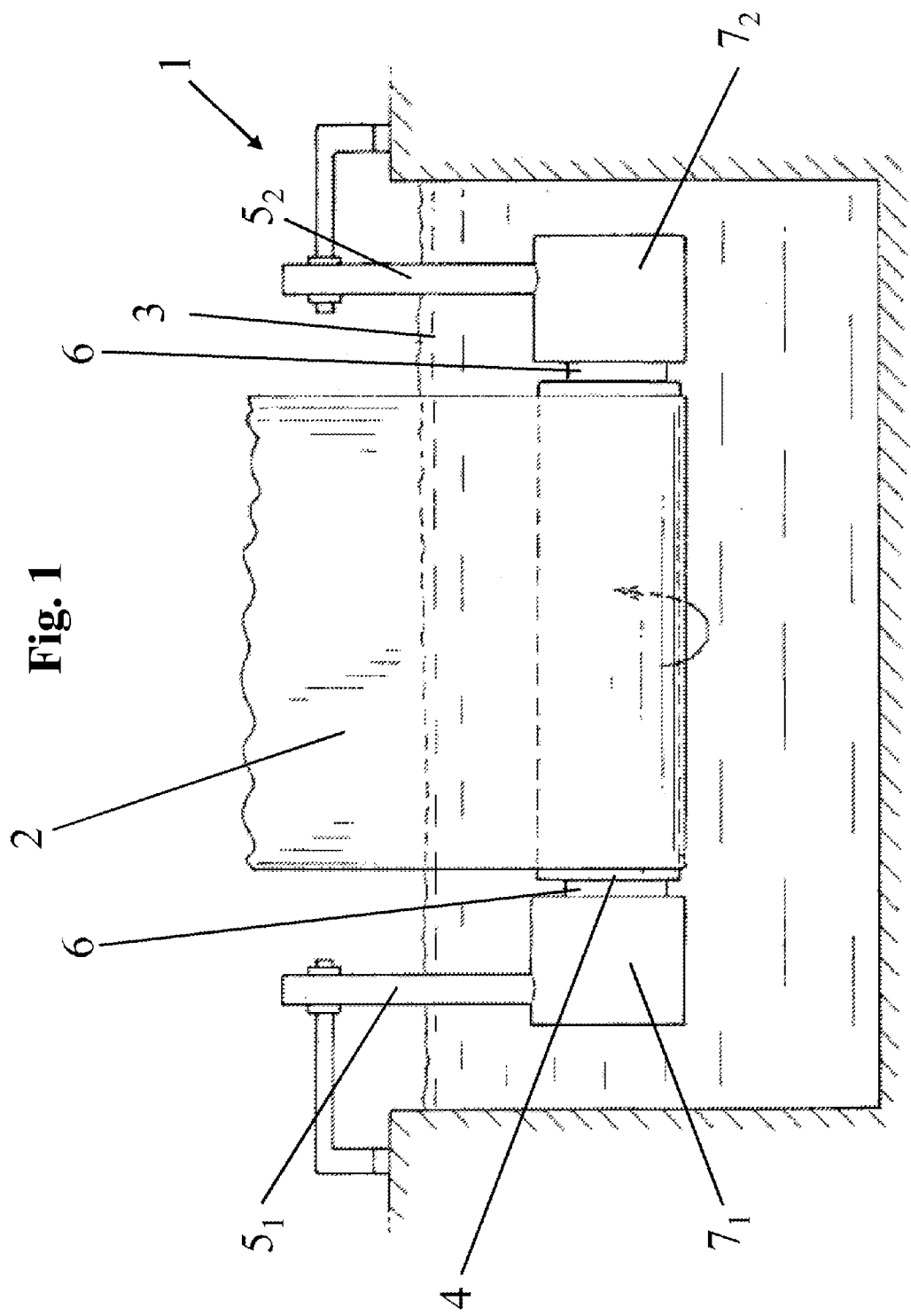
FIG. 1 shows a side elevational view of a coating device with a guide roller rotating bearing according to the present invention in a molten metal bath.

FIG. 1 is a simplified side elevational view of a coating device 1 for coating a metal band 2 in a molten metal bath 3. The metal band 2 is passed through the molten metal bath 3 so as to provide the surface of the metal band 2 with a thin metal coating.

The metal band 2 is introduced into the molten metal bath 3 and is led vertically upward out from the molten metal bath 3 by means of a guide roller in the form of a rotatable guide shaft 4. The pulling force of the metal band is between 0.8 and 6.5 t. The molten metal bath 3 can, for example, consist of liquid zinc, tin, lead, aluminum, Galvalume®, Galfan® or another metal suitable for metal coating. Depending on the molten metal chosen, the molten metal bath 3 has a temperature of 400° C. to 700° C. The coating process is effected at band speeds of up to 250 m/min.

The guide shaft 4 is held in the molten metal bath 3 by two pivot arms $5_1$, $5_2$. The guide shaft 4 can be removed from the molten metal bath 3 for maintenance or repair purposes.

Both immersed ends of the pivot arms $5_1$, $5_2$ are provided with a respective roller bearing device $7_1$, $7_2$ in which the respective shaft ends 6 of the guide shaft 4 are rotatably supported.

Figure 2:
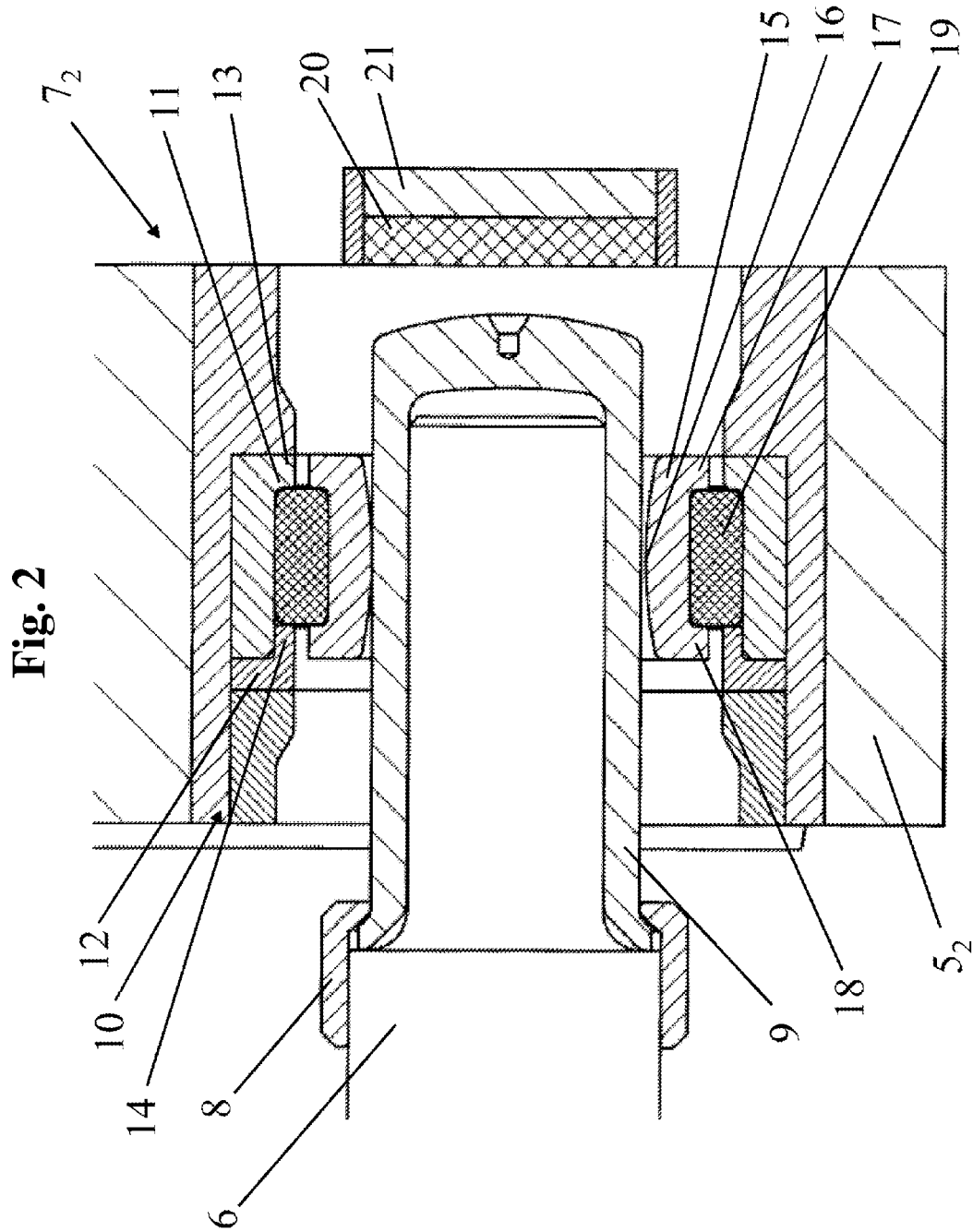
FIG. 2 shows a longitudinal section through the gearing device of FIG. 1.
Figure 3:
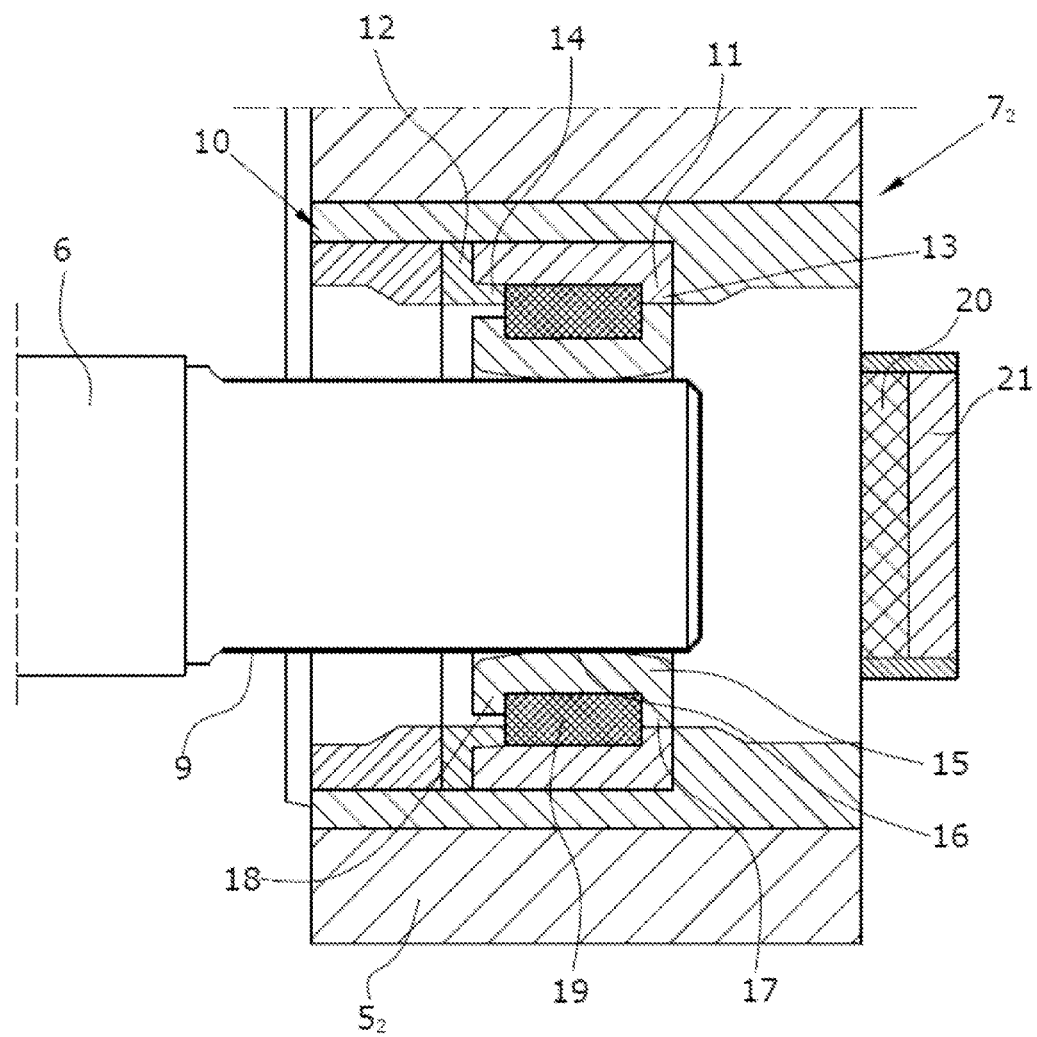
FIG. 3 shows a longitudinal section through the gearing device of FIG. 1 where the protective covering is a coating.

The structure of the two roller bearing devices $7_1$, $7_2$ is shown in detail in FIG. 2. A bushing 9 is rotationally fixed on the shaft end 6 by means of a clamping member 8. In the present case, this bushing 9 serves as a protective covering for the shaft end 6 so as to protect the same from abrasive wear caused by the cooperation with the roller bearing device $7_2$. To achieve this, the bushing 9 of the present embodiment is made from a hard alloy on a cobalt-chromium basis.

The shaft end 6 thus provided with the bushing 9 is supported in the roller bearing device $7_2$ such that it is displaceable in both axial directions. To this end, a bipartite pivot arm bushing 10 is provided in the pivot arm $5_2$, in which an outer ring 11 and the associated safety ring 12 are fixed by interference fitting. The outer ring 11 has a first flange member 13 and the safety ring 12 forms the second flange member 14 as a loose flange element. The roller bearing device $7_2$ also has an inner ring 15 that allows for the displaceability of the shaft end in both axial directions. In order to also allow for an angular offset of the shaft end 6, the surface 16 of the inner ring 15 facing towards the bushing 9, is convex in the longitudinal direction. In this manner, a punctual contact between the bushing 9 and the inner ring 15 can be obtained. Moreover, the inner ring 15 has two flange members 17 and 18 on the surface facing towards the outer ring 11. The flange members 13, 14, 17 and 18 thus fix the cylindrical rollers 19 in both axial directions between the inner ring 15 and the outer ring 11.

In the embodiment described, all parts of the roller bearing device $7_2$, i.e., the outer ring 11, the safety ring 12, the inner ring 15 and the cylindrical rollers 19, are made of a ceramic material.

Provided in the axial direction, opposite the shaft end 6, is a thrust washer 20 of ceramic material that serves as an axial bearing. In a manner not illustrated, the thrust washer 20 is fastened to the pivot arm $5_2$ by means of a fastening member 21.

For the purpose of replacing worn roller bearing parts or of the bushing 9, the pivot arms $5_1$, $5_2$ pivot the roller bearing devices $7_1$, $7_2$ with the guide shaft 4 out of the molten metal bath 3. After the roller bearing devices $7_1$, $7_2$ have cooled, the bipartite pivot arm bushing 10 can be released and the respective parts can be removed and replaced.

The present invention is not limited to embodiments described herein; reference should be had to the appended claims.

The invention claimed is:

1. Guide roller rotating bearing for a metal melt bath, the guide roller rotating bearing comprising:
   pivot arms;
   a roller bearing device arranged on each of the pivot arms, the roller bearing device comprising
      an outer ring with first and second outer ring flange members, the outer ring being fixed to at least one of the pivot arms,
      cylindrical rollers configured as rolling elements, and
      an inner ring with first and second inner ring flange members, wherein the first and second outer ring flange members and the first and second inner ring flange members are configured to fix the cylindrical rollers in an axial direction; and
   a shaft end comprising a protective covering disposed in the roller bearing device, the protective covering comprising a protective covering material that exhibits a wear-resistance which is higher than a wear resistance of the shaft end.

2. The guide roller rotating bearing as recited in claim 1, wherein a surface of the inner ring directed towards the protective covering is convex in a longitudinal section.

3. The guide roller rotating bearing as recited in claim 1, wherein at least one of the inner ring, the cylindrical rollers and the outer ring is made of a ceramic material.

4. The guide roller rotating bearing as recited in claim 1, wherein the protective covering material is an alloy based on a cobalt-chromium.

5. The guide roller rotating bearing as recited in claim 1, wherein the protective covering is a coating.

6. The guide roller rotating bearing as recited in claim 1, wherein the protective covering is a rotationally fixed bushing.

7. The guide roller rotating bearing as recited in claim 6, further comprising a clamping member configured to hold the rotationally fixed bushing on the shaft end.

8. The guide roller rotating bearing as recited in claim 1, further comprising a thrust washer of a ceramic material disposed opposite the shaft end in the axial direction.

9. The guide roller rotating bearing as recited in claim 1, wherein the second outer ring flange member is formed as a loose flange element which is provided as a safety ring at the outer ring.

10. The guide roller rotating bearing as recited in claim 1, wherein a distance between the inner ring and the protective covering is configured so that the shaft end is movable in the axial direction.

* * * * *